(12) United States Patent
Baumann et al.

(10) Patent No.: US 6,811,507 B2
(45) Date of Patent: Nov. 2, 2004

(54) PLATE-LINK CHAIN

(75) Inventors: Markus Baumann, Bühl (DE); Lothar Moser, Ottersweier (DE); Werner Kreiss, Erlangen (DE)

(73) Assignees: LuK Lamellen und Kupplungsbau Beteiligungs KG, Bühl (DE); INA Wälzlager Schaeffler oHG, Herzogenaurach (DE)

( * ) Notice: Subject to any disclaimer, the term of this patent is extended or adjusted under 35 U.S.C. 154(b) by 0 days.

(21) Appl. No.: 09/945,551

(22) Filed: Sep. 2, 2001

(65) Prior Publication Data

US 2002/0068654 A1 Jun. 6, 2002

(30) Foreign Application Priority Data

Sep. 6, 2000 (DE) .......................................... 100 43 963

(51) Int. Cl.[7] .......................... F16G 13/06; F16G 1/28; C23C 8/30
(52) U.S. Cl. ...................... 474/215; 474/201; 474/242; 148/206; 148/212
(58) Field of Search ................................. 474/214, 215, 474/237, 242, 244, 245, 248, 201, 8, 229, 212, 206, 230; 29/29; 242/155; 148/211, 217, 220, 206–208, 212–214

(56) References Cited

U.S. PATENT DOCUMENTS

| | | | | | |
|---|---|---|---|---|---|
| 3,049,933 A | * | 8/1962 | Besel | ........................ | 474/242 |
| 4,571,229 A | * | 2/1986 | Burk | ........................ | 474/231 |
| 4,698,050 A | * | 10/1987 | Hattori et al. | .............. | 474/242 |
| 4,944,715 A | * | 7/1990 | Ueda et al. | ................. | 474/245 |
| 5,728,021 A | * | 3/1998 | van Rooij et al. | .......... | 474/229 |
| 6,066,068 A | * | 5/2000 | Takemura et al. | ............ | 476/40 |
| 6,142,903 A | * | 11/2000 | Heinrich | ..................... | 474/215 |
| 6,254,503 B1 | * | 7/2001 | Chiba et al. | ................... | 474/8 |
| 6,294,029 B1 | * | 9/2001 | Sakate et al. | ............... | 148/211 |

\* cited by examiner

*Primary Examiner*—Marcus Charles
(74) *Attorney, Agent, or Firm*—Alfred J. Mangels

(57) ABSTRACT

A continuously variable, conical disk transmission including a torque-transmitting member in the form of a plate-link chain or a thrust link band. The chain includes plate links that are interconnected by pairs of rocker members that extend transversely relative to the chain movement direction. The thrust link band includes a number of thrust links that are in face-to-back contact and that extend transversely relative to the band movement direction. Each of the rocker members and the thrust links have ends that contact surfaces of the conical disks of the transmission for transmitting torque between the sets of disks. The ends of the rocker members and of the thrust links have a carbon-nitrided outer layer having a thickness of at least about 50 μm for increased durability. The surfaces of the conical disks that are contacted by the chain or the thrust link band can also be similarly treated.

21 Claims, 8 Drawing Sheets

PLATE-LINK CHAIN

BACKGROUND OF THE INVENTION

1. Field of the Invention

The present invention relates to a transmission component, in particular a plate-link chain especially for continuously adjustable, belt-driven, conical pulley transmissions. More particularly, the plate-link chain includes individual chain links formed form plate-link sets that are connected by pairs of articulation members that are inserted into apertures of the plate links and are formed as rocker members having rocker faces supported against each other. Furthermore, the invention relates to a thrust-carrying link band, especially for continuously adjustable, belt-driven, conical pulley transmissions, with at least one closed belt strand and thrust links carried by the strand. In addition, the invention relates to a continuously adjustable, belt-driven, conical pulley transmission with a first shaft and a second shaft, whereby on each of the first and second shafts two conical disks are provided that have essentially conically-formed surfaces that face each other, whereby at least one conical disk per shaft is axially movable relative to the shaft.

2. Description of the Related Art

Such plate-link chains and transmissions are known from DE 38268009 and DE 195 44 644. Thrust link bands of the type mentioned above are known from DE 31 45 470.

In transmission components, such as plate-link chains, thrust link bands, and drive elements, because of substantial frictional forces in the frictionally-based force transfer between the endless torque-transmitting member and the conical disks in belt-driven, conical pulley transmissions, substantial pressing forces are necessary to support the drive torque transmitted by the transmission.

With increasing power concentrations at the friction points of the transmission, the losses that are therein dissipated also rise, and the thermal and mechanical load increases considerably, so that impermissibly high wear of contacting members can occur.

An object of the invention is to produce a transmission component, such as a plate-link chain, or in accordance with a further concept of the invention, a thrust link band, or in accordance with a further concept of the invention, a belt-driven, conical pulley transmission with conical disks, which relative to the state of the art particularly withstand a higher operating load or have a higher durability at the same load.

SUMMARY OF THE INVENTION

That object is advantageously attained in plate-link chains if at least the end faces of the rocker members that are in operative contact with the conical disks are provided with a nitrogen-enriched outer layer, such as a carbon-nitride layer.

In thrust link bands, that object is advantageously achieved if at least the end faces that come into operative contact with the thrust elements are provided with a nitrogen-enriched outer layer, such as a carbon-nitride layer.

In continuously adjustable, belt-driven, conical pulley transmissions, that object is advantageously achieved if at least the truncated conical surfaces of the conical disks that are in operative contact with an endless torque-transmitting means, such as a plate-link chain or a thrust link band, are provided with a nitrogen-enriched outer layer, such as a carbon-nitride layer.

It is thereby appropriate if the outer layer is characterized in such a way that a nitrogen content of at least 0.01%, advantageously at least in the range of 0.05% to 0.1%, is present in an outer layer of at least 50 μm.

It is especially appropriate if besides a carbon-nitride process, a hardening process is likewise carried out. Thereby it is appropriate if the carburized depth in the region is greater than 0.3 mm, preferably greater than 0.5 mm.

In plate-link chains of the type mentioned, a stretching process of the extended plate-link chain is conducted, to increase the load-carrying capacity after assembly of the plate links and rocker members, in an open band in a straight strand while applying considerable pulling forces. In that way, contact areas of the plate links between the plate links and the rocker members of all plate links of a row are uniformly plastically deformed. In stretching the straight strand, an even plastic deforming of the plate links occurs in the contact areas, so that the plate links of a row of plate links are equally lengthened across the width of the plate links, or have the same length. That has the drawback that the chains do not manifest an optimal durability and performance capacity under load of the plate-link chain during operation of the continuously adjustable transmission.

An additional object of the invention is to produce a plate-link chain and a process for manufacturing a plate-link chain which, in relation to plate-link chains of the state of the art, especially withstand a higher operating toad or have a longer durability at the same load.

That is achieved in accordance with the invention with the above-mentioned plate-link chains in that the plate-link chain is stretched when in the closed condition.

The objective of the invention is also accomplished in that, with a plate-link chain of the type mentioned above, the plate links have a different plate-link inner width as a function of chain width. That result can be obtained in accordance with the invention by a stretching of the plate-link chain in the closed state, when it is in a loop.

The concept of plate-link inner width corresponds with the distance between the contours on which the two outer rocker members lie against the plate link. That is consequently a distance that is independent of whether the plate link has one central opening or two openings for receiving the rocker members. Further particulars are presented in the description of the figures.

It is, however, advantageous in another embodiment if the plate links are manufactured differently in the production process, such as by a stamping process or a cutting process, for example, or by means of a laser, or the like, and the individual plate links are stretched equally or differently and are assembled with one another or the assembled chain is stretched when in a loop.

It is also appropriate by a further embodiment if the plate links with the same plate-link inner width are produced by a stamping process and stretched differently and assembled with each other. In that embodiment the stretching can also be conducted on the individual plate links prior to assembly, or on the assembled chain when in a loop.

In accordance with a further concept of the invention, the objective of the invention can also be accomplished in connection with a plate-link chain of the type described above in that the plate links have a different degree of stretching as a function of the chain width.

That object can be advantageously accomplished in that the plate links with the same or different plate link inner widths are stretched with a different degree of stretching and can be assembled with each other. That object can also be achieved by stretching when in a loop.

In accordance with a further inventive concept, the objective of the invention can also be accomplished with a plate-link chain of the type described above in that the plate links have, as a function of chain width, a different angle between the contact areas and an axis viewed transversely to the longitudinal direction of the chain. In that way, a modulation or variation of that angle is achieved across the chain width, which allows a relatively good adaptation or position of the plate links to the partially curved rocker members during operation of the chain.

In accordance with a further inventive concept, the objective of the invention in a plate-link chain of the type described above can also be accomplished in that the plate links are acted upon in the stretching process with a stretching load at a variable angle in relation to the longitudinal direction of the plate links in that way, the plate links in their contact areas with the rocker members are stretched at different positions, and thereby strengthened such that they exhibit sufficient strength when loaded during operation of the chain, both in the straight strand between the pairs of conical disks as well as in the region of the pairs of conical disks.

It is especially advantageous if the plate links are individually stretched and subsequently assembled with one another. In another embodiment, it is appropriate that the plate links are stretched when in the assembled condition of a closed chain, such as especially in a loop arranged between two sets of conical disks of an apparatus.

The invention relates advantageously to plate-link chains in which at least one of the end faces of the rocker members per link facing the respective conical disks transmits the frictional forces between the conical disks and the plate-link chain. It can also be appropriate according to the application of the embodiment for the rocker members to be equally long or to be of different lengths.

The invention advantageously also relates, however, to plate-link chains in which the plate-link chain has, in addition to the rocker members, crosspins that transmit the frictional forces between the conical disks and the plate-link chain.

It is especially advantageous if the plate links adjacent to the edge of the plate-link chain are more highly lengthened than the plate links arranged in the middle of the plate-link chain, or if plate links adjacent to the edge of the plate-link chain have a greater inner width than the plate links arranged in the middle of the plate-link chain.

Furthermore, it is appropriate if areas of the plate links that contact the rocker members are plastically deformed by a stretching process, so that an angle is formed between the contact areas and a direction transverse to the longitudinal direction of the chain.

It is also appropriate when the plastically deformed contact areas of the plate links viewed across the width of the chain form a curved shape, or the shape of a polynomial of the $n^{th}$ degree.

It is especially advantageous if the plate-link chain is received in the gap between two pairs of conical disks and rotation and/or torque is applied during the stretching process.

It is also appropriate if the stress applied to the plate-link chain during the stretching process is caused by an axial load through contact pressure from the conical disk and/or through spreading apart of the axes of the pairs of conical disks. Accordingly, the invention also relates to an apparatus for stretching a plate-link chain. Thereby it is appropriate that the conical disks of the pairs of conical disks are movable relative to each other or are fixed.

During stretching of the plate-link chain it is appropriate if the torque that can be applied during the stretching process is substantially greater than the nominal torque during operation of a transmission equipped with a plate-link chain.

It is also appropriate for the torque applied during the stretching process to be in the region between zero and ten times, preferably three times to five times, the nominal torque during the operation of a transmission equipped with a plate-link chain.

It is also appropriate if the tension in the strand of chain during the stretching process is greater than the nominal tension during the operation of a transmission equipped with a plate-link chain.

The invention also relates to a process for manufacturing a plate-link chain and to a process for stretching a plate-link chain.

BRIEF DESCRIPTION OF THE DRAWINGS

Further material inventive features and details result from the following description of embodiments, which are represented in the drawings. The drawings show.

DESCRIPTION OF THE PREFERRED EMBODIMENTS

Figure 1:
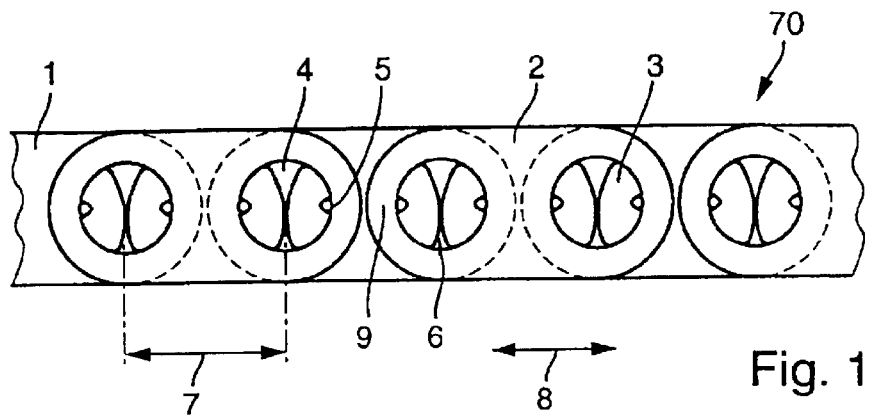
FIG. 1 shows a known plate-link chain with a double link connection in a side view.
Figure 3:
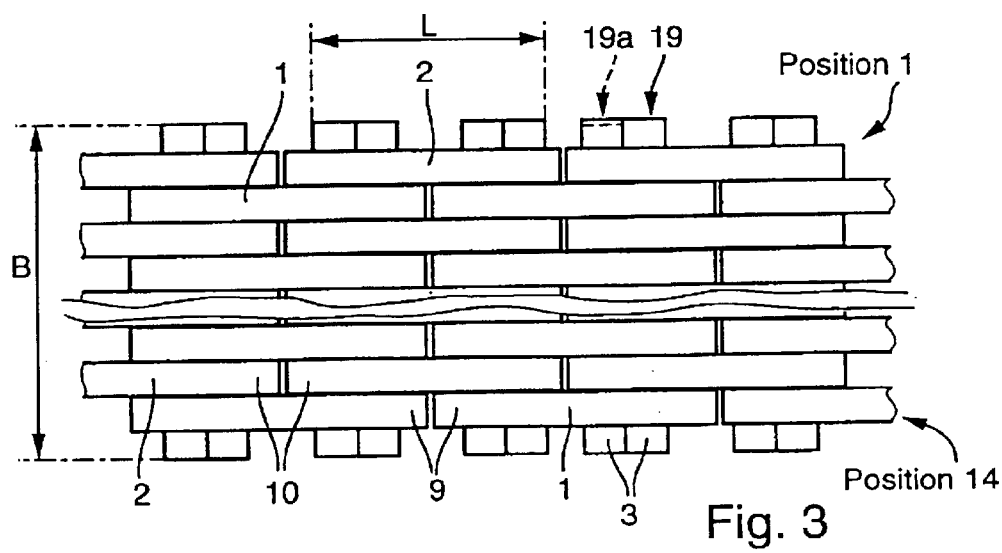
FIG. 3 shows a top view of the plate-link chain shown in FIG. 1.

FIGS. 1 and 3 show a side view and a top view of a portion of a known plate-link chain with standard plate links 1 and outer plate links 2, wherein the plate links as viewed are arranged over the width B of the plate-link chain and repeat themselves in an appropriate arrangement pattern. The plate links form link sets in series. The chain links formed by the plate links 1 and 2 are articulated by articulation members that are connected with each other, which are composed of pairs of rocker members 3, which are inserted into openings 4 in the plate links and are pivotably coupled and connected by an interlocking connection 5 with the particular associated plate links. The openings 4 can be formed in such a way that there are two openings formed per plate link for both links, or also that per plate only one opening is provided to receive rocker members for both links. The rocker members 3 have, for example, at least single convex rocker faces 6 that are directed toward each other and that can roll against each other, which permits the link movement of adjacent chain links. The rocker faces can both be convex or one rocker face can be flat or concave and the other rocker face is convex.

Such plate-link chains can be formed in such a way that at least some rocker members are at least partially non-rotatably connected with their plate links associated with their chain links.

The individual links have a center-to-center spacing 7 that in general is designated the chain pitch. The magnitude of the chain pitch 7 depends on the given extent of the rocker members 3 in the direction of movement 8 of the chain, as well as on the necessary spacing between the individual openings 4. It is generally known that the chain pitch 7 is designed to remain unchanged over the full chain length; it can, however, also vary irregularly within given limits if necessary, in order to favorably influence the noise developed by the chain.

The rocker members have end faces at their side end areas with which they can frictionally engage the conical disks during operation of a transmission. It is advantageous for both rocker members to have the same length, so that both rocker members are in contacting engagement with the conical disk. In another embodiment it is appropriate to provide rocker members having different lengths and thereby only one rocker member per link is in frictional contact with the conical disk.

It can be seen from the top view of FIG. 3 that the chain is assembled as a double-link unit, which means that in each case two radial end links 9, 10, respectively, of adjacent chain links are positioned adjacent to each other between two pairs of rocker members 3, whereby the spacing of those links formed by pairs of rocker members is correspondingly determined.

FIG. 3 likewise shows the outer layer 19a of end face 19, which is advantageously improved by a carbon-nitride process, and if necessary by a hardening process.

Figure 4:
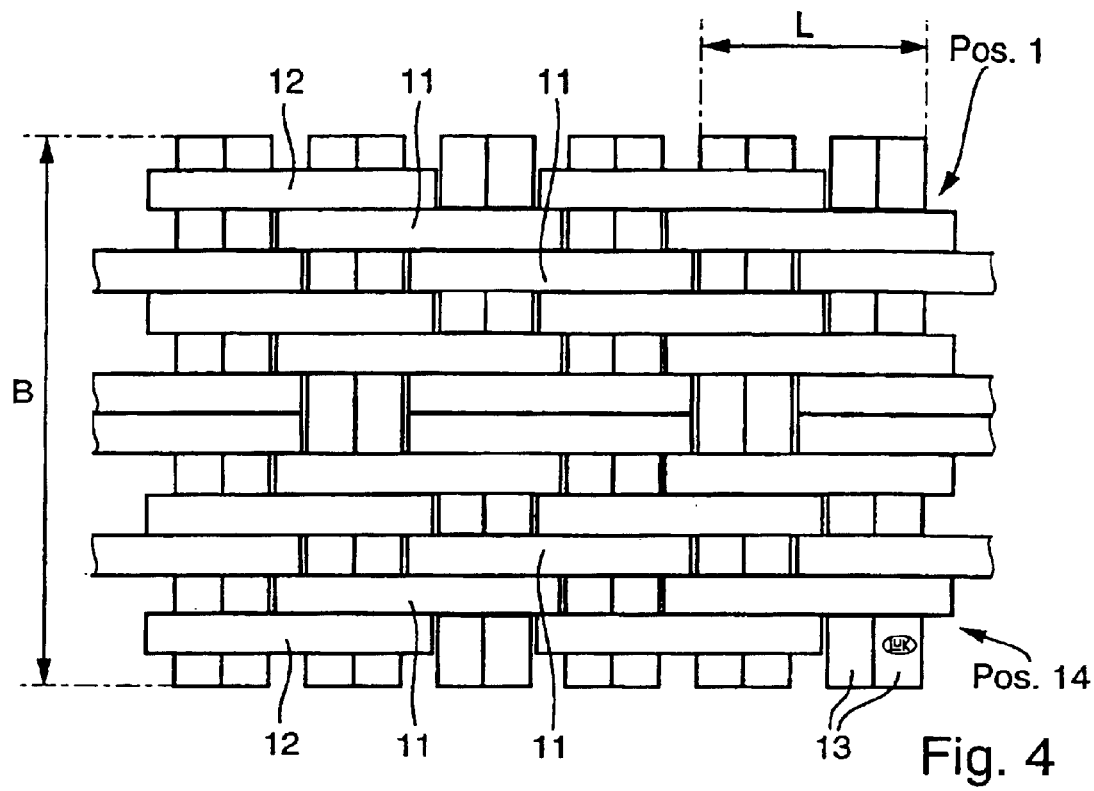
FIG. 4 shows a top view corresponding with FIG. 3 to represent the triple link connection of a known plate-link chain in accordance with FIG. 2.

It can be seen from the top view of FIG. 4 how known chains can be constructed as triple-link units. Here can be seen over the width of the chain the standard plate links 11 and the outer plate links 12 that are set against each other in each case and separated in the direction of chain movement, whereby on the other hand, however, the spacing between links assembled by pairs of rocker members 13 can be reduced compared with the double-link unit in accordance with FIG. 3.

Figure 2:
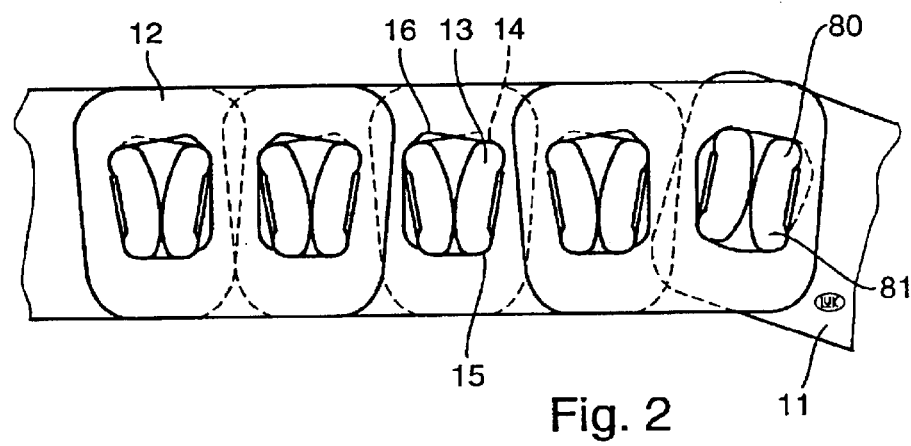
FIG. 2 shows a side view of another design of a known plate-link chain.

The top view of FIG. 4 corresponds with another known chain construction, shown in a side view in FIG. 2, having standard plate links 11 and outer plate links 12, whereby the articulation members are composed of pairs of rocker members 13. These rocker members 13 are shaped in such a way that they only lie against the plate link openings 16 at two positions 14 and 15. Between the contact positions 14 and 15 the rocker members 13 are free of the plate links 11, 12 of the chain.

For carbon-nitriding and hardening in accordance with the invention, on at least the end faces of the endless, torque-transmitting means and/or the conical disk surfaces, a diffusion/solution treatment, for example, can be applied to produce a nitrogen-enriched outer layer (carbon-nitrided layer) with subsequent hardening.

For case hardened steels as the material for the chain, thrust link belt, or conical disk transmission components, the following results, for example, are produced:

Annealing treatment for the purpose of outer layer carburization, or outer layer carburization and nitrification, in the temperature range between 780° C. and 1050° C. The duration of the annealing treatment is determined by the desired case hardening depth and the process/medium selected for carburizing or nitrification (gas, salt bath, or granulate). The preferred process is gas carburizing/nitrification in a carburizing atmosphere, in which natural gas, propane, or other C-containing enrichment gases and ammonia are admixed as reaction gases.

Furnace cooling to hardening temperature with subsequent martensitic hardening by quenching to T<Ms. The retention time at hardening temperature is to be selected corresponding to the necessary duration until temperature equilibrium is reached in the structural component.

Tempering/annealing at temperatures between 150° C. and 250° C.

The case hardening depth of conical disks is preferably greater than 0.5 mm. A possible variant of carbon-nitriding in connection with the case hardening is the separation of carburizing and nitrification in the individual annealing phases: during diffusion annealing (1) carburizing takes place, and nitrification at hardening temperature. That method has the following advantages compared with simultaneous carburizing and nitrification: 1. better possibility of regulating C-potential, 2. smaller carbon-nitrided layer densities on the basis of shorter nitrification times and therewith thoroughly lower total C and N concentrations, that is, higher toughness and less residual austenite in the outer area.

Carbon-nitriding in roller bearing or heat-treatable steels:

With roller bearing or heat-treatable steels as a basic material for friction-force-carrying elements of the endless, torque-transmitting loop member, carbon-nitriding preferably takes place directly at hardening temperature without the prior diffusion annealing treatment employed in connection with case-hardening steels. The hardening temperatures typically lie between 800° C. and 900° C., the holding times between 10' and 2 h.

A prerequisite for favorable wear behavior is that at least 0.01%, preferably 0.05% to 0.1% nitrogen up to a depth of preferably 50 $\mu$m is present in the outer layer.

Hardening by quenching can take place both in the martensitic stage (T<<Ms) as well as in the intermediate stage (for example, bainite at temperatures around Ms), whereby martensitic hardened parts must be tempered subsequently (tempering temperature about 150° C. to 250° C.).

In comparison with conventional hardening, among other things the following advantages result from the freedom from wear of carbon-nitrided rocker members of the chain:
- with the same dimensions of the conical disks, a greater transmission spread can be realized than with conventionally hardened rocker members, as limiting transmission ratios practically do not change,
- higher tempering permanence, therewith less damage by slippage or sliding of the endless loop member,
- a lower surface grade of conical disks is tolerable,
- less contamination of the transmission and greater oil longevity,
- possibility of influencing chain acoustics, for example, over the chain width (randomizing the chain width or selective succession of shorter and longer rocker members)

Advantages of carbon-nitrided conical disks:
better resistance to pitting
lower scuffing tendency in connection with carbon-nitrided rocker members
higher good tempering properties
less surface abrasion, from which follows a lower contour alteration and a better ability to regulate the transmission with regard to transmission ratio and contact pressure.
it is furthermore advantageous if the elements carrying the frictional force are made of alloy steel, are fully hardened, and have at their core a predominantly martensitic or a predominantly bainitic structure and a nitrogen-enriched outer layer (carbon-nitrided layer).

It is also advantageous if the elements carrying the frictional force are manufactured of alloy steel and if a nitrogen content of at least 0.05% is present to a depth of 50 µm in the carbon-nitrided layer.

Figure 5:
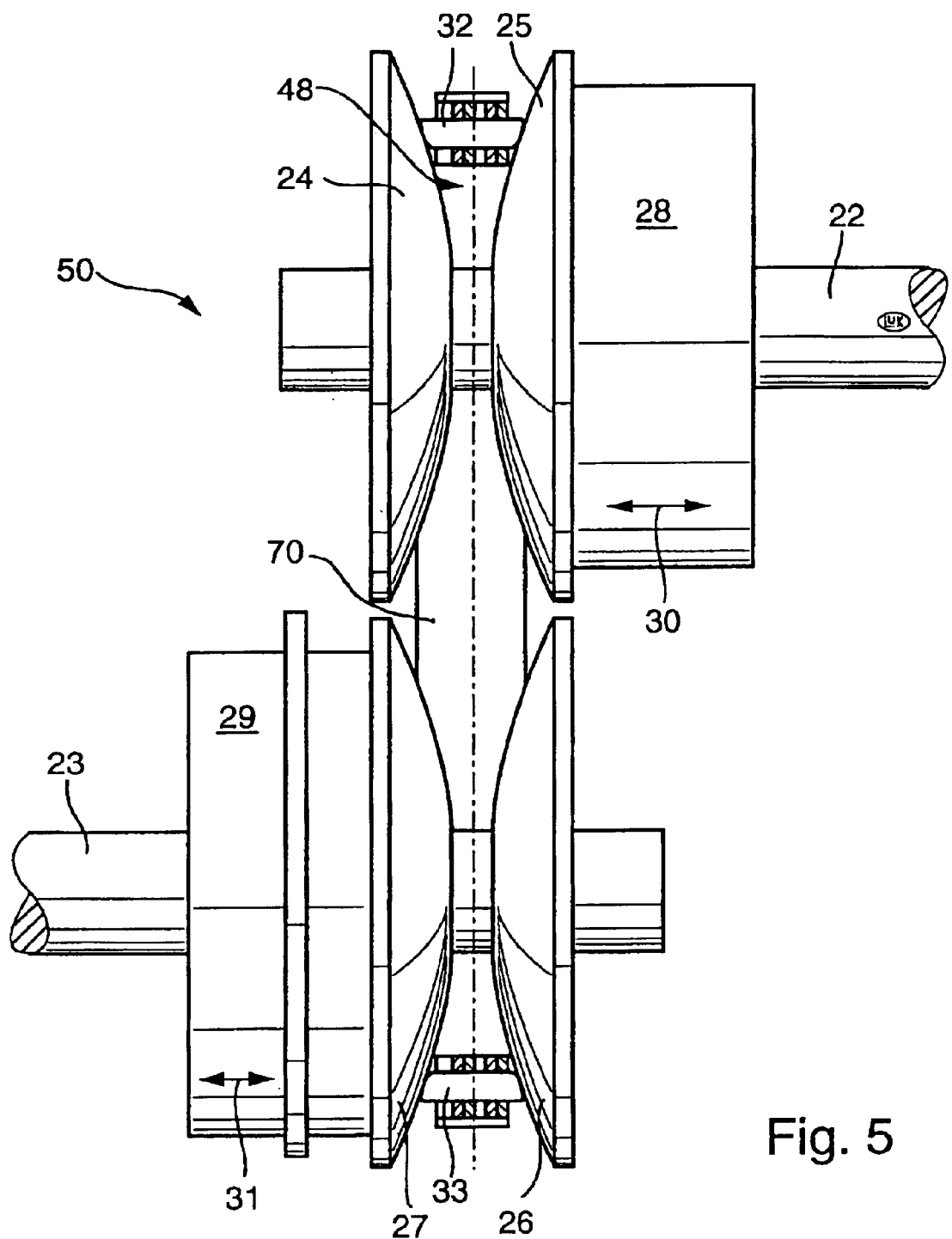
FIG. 5 shows a schematic representation of an apparatus for stretching a plate-link chain.

FIG. 5 shows an arrangement 50 to stretch a plate-link chain 32 in accordance with the invention, whereby the plate-link chain 32 is received in a conical disk gap 48 between two sets of conical disks. The arrangement of FIG. 5 can, however, also act as a loop-driven, conical pulley transmission, which in operation includes a chain in accordance with the invention. One set of conical disks is formed by the two conical disks 24 and 25 that are axially displaceable relative to each other. The one conical disk 25 is axially movable, see arrow 30. The adjusting cylinder 28 serves to axially displace the chain and to press it against the set of conical disks.

The other set of conical disks is formed from the two conical disks 26 and 27 that are axially displaceable relative to each other. For that purpose one conical disk 27 can be shifted axially, see arrow 31. The adjusting cylinder 29 serves to axially displace the chain and to press it against the set of conical disks. The rotational speed and/or the torque can be adjusted by the input side shaft 22 and the output side shaft 23.

According to another embodiment of an apparatus for stretching a plate-link chain, it can be advantageous for the axes or shafts of the apparatus to be pulled away from each other by the application of a force, so that the plate-link chain is forced into the conical-disk gap and so the power transmission between the plate-link chain and the conical disks can be set at the desired value. In addition, it is not absolutely necessary that the conical disks of the pairs of conical disks be axially displaceable relative to each other. It can also be suitable that the conical disks are rigidly affixed to each other.

When stretching the chain in the loop direction after assembly, the individual links of the plate-link chain will be tight against the rocker members. Thereafter it will be placed in a variable speed unit, for example in accordance with FIG. 5. The chain is stretched in the loop direction by the compression between the rocker members and the conical disks and/or by torque transmission. In addition, there will be set a multiple of the pressing forces and torques that normally appear in a transmission, and the chain will be allowed, for example, to run through the variable speed unit with fewer revolutions, so that each chain link, such as plate links and rocker members, passes around the variable speed unit at least once or several times. It is advantageous for the chain to be rotated slowly and with fewer revolutions, compared with the conditions in a motor vehicle transmission.

Typically, the stretching process can be carried out in the starting gear ratio (underdrive), whereby the torque of the variable speed unit is adjustable within the range of from zero to ten times the nominal torque, that is, the maximum torque that occurs in the transmission. In particular, a torque in the range of approximately three times the maximum moment of the variable speed unit is set. It is also appropriate that the tension in the strand 70 of the chain is larger during the stretching process than during operation of the transmission. Advantageously, the tension is at least twice the maximum tension during normal transmission operation.

The plate-link chain is then rotated at a low rotational speed, in the range of about 0.5 revolutions per minute to about 500 revolutions, advantageously from about 10 revolutions per minute to 50 revolutions per minute, over several revolutions or passes. It can be beneficial, depending upon the plate-link chain, to perform 1 to 20 revolutions.

In accordance with the invention, the transmission ratio can also be changed during the stretching process.

In that way the load distribution is set in a manner corresponding substantially with underdrive (starting gear ratio) in the vehicle. During a stretching process, however, another transmission ratio can also be set, such as, for example, an overdrive transmission ratio or a variable transmission ratio. The advantage of the stretching process in the wrap-around member is that the chain is stretched substantially at each bend of the chain that occurs during operation, and as a result the load distribution is similar to the actual load distribution during operation of the transmission.

As a result of the stretching process in the loop member, on the basis of the contact pressure and/or the torque loading of the chain that is loaded in that manner, the rocker members, considered relative to the shaft of the set of disks, are elastically deformed, or bent, in the radial direction as well as in the circumferential direction. As a result, considered over the width of the chain, the outwardly-disposed plate links are more heavily loaded than the plate links disposed in the middle of the chain. That has the result that the outer plate links or those plate links disposed on the edge are more greatly elongated than the plate links disposed inwardly, and those outer plate links experience a higher degree of stretching than the inner plate links. By the degree of stretching is meant the condition between the loading by stretching and the condition of ultimate load.

Moreover, it can be beneficial for the plate links of one plate-link row which when assembled have the same length, for those plate links to be elongated differently as a function of the width.

Likewise, it can be beneficial for the plate links of one plate-link row when assembled to already exhibit different lengths and plate-link inner widths, respectively, so that the plate links disposed at the edge of the chain exhibit a larger plate-link inner width than the middle plate links. That can be especially appropriate when stretching is not of the loop member, but, on the contrary, the plate links are stretched before assembly and the plate links are thereafter assembled together to form a chain. Then one can, on the basis of the assembly of the plate links having different plate-link inner widths, construct a chain that already has at its edges longer plate-link inner widths than in the middle. That is shown in exemplary form in FIG. 12 where it is shown that the plate-link inner width as a function of the position of the plate links is greater at the edge than in the middle. That can result both from the stretching process in the loop member as well as from the assembly of different length plate links in accordance with the invention.

Additionally, the plate links that are stretched by a stretching process before assembly can be stretched with different degrees of stretch, and during assembly they can be constructed in such a way that the plate links with a higher degree of stretching are arranged at the edge of the chain. That has the result that the outer plate links or those plate links arranged at the edge are more highly plasticized and loaded than the inwardly-arranged plate links, and those outer plate links experience a higher degree of stretch than the inner plate links. That is shown in exemplary form in FIG. 11 where it is shown that the degree of stretching as a function of plate link position is greater at the edges than in the middle area. That can result both through the stretching process of the loop member and also through the assembly of various highly-stretched plate links in accordance with the invention.

Figure 6:
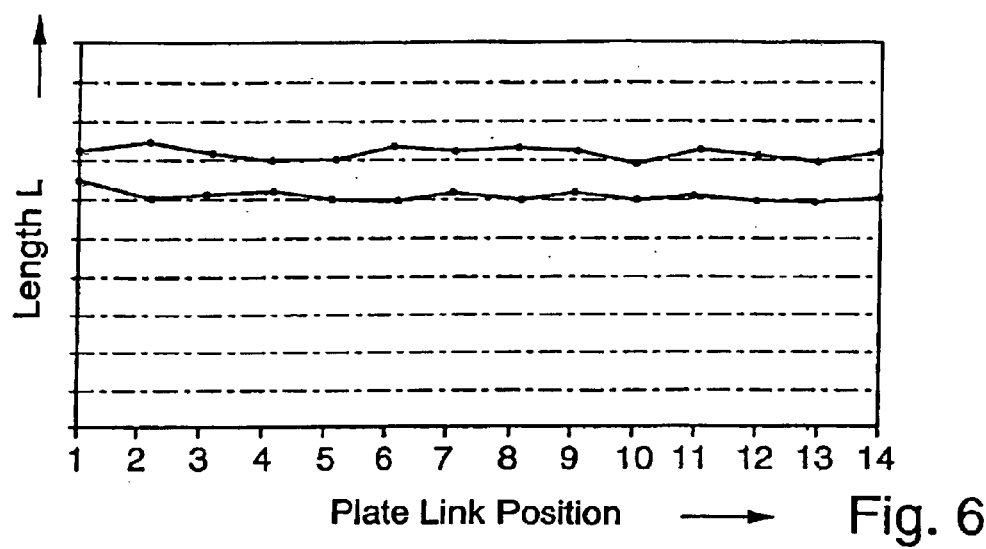
FIG. 6 shows a plot.
Figure 7:
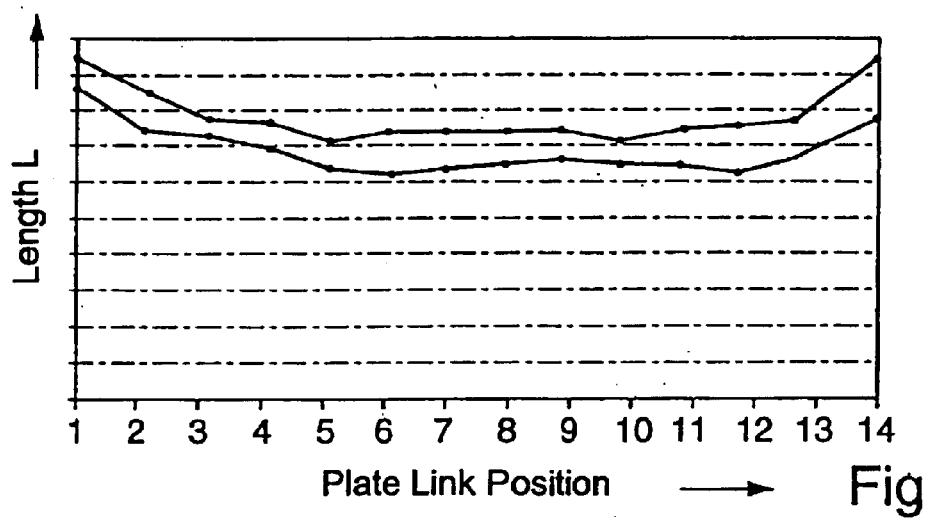
FIG. 7 shows a plot.
Figure 8:
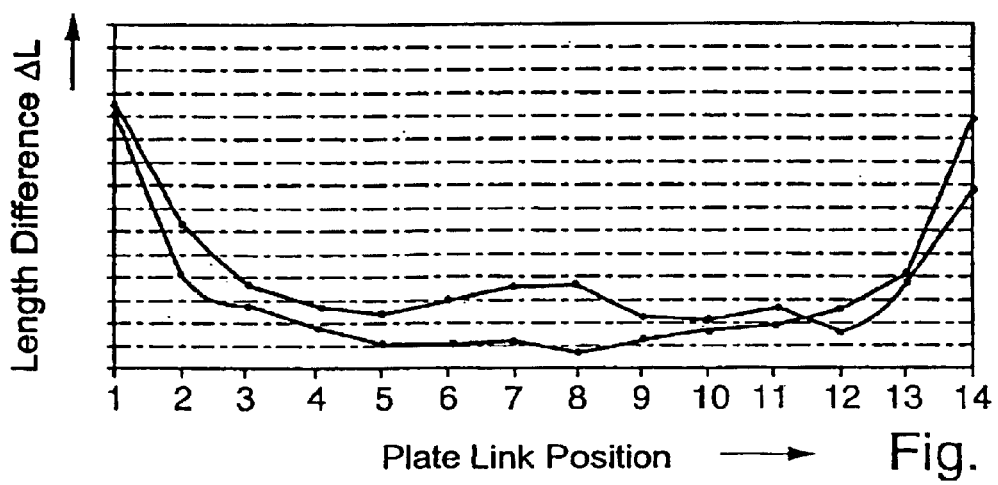
FIG. 8 shows a plot.

FIGS. 6 through 8 show in graphs the condition of the lengths of the plate links considered as a function of their disposition across the width of the chain. On the y-axes of FIGS. 6 and 7 are shown the lengths of the plate links and the length of the spacing L between both contact areas of one plate link, respectively. The length L also represents the plate-link inner width. In FIG. 8 is shown the length difference ΔL of the plate links between an unstretched and a stretched condition in accordance with the invention. Shown along the x-axes of each of FIGS. 6 through 8 is the position of the plate links across the width of the chain. Position 1 corresponds with the position of the plate link on one side of the chain and position 14 corresponds with the position of the plate link on the other side of the chain. Positions 2 through 13 correspond with the plate link positions between the edge plate links 1 and 14. Thereby there is shown specifically a chain with 14 plate link positions across the width of the chain as an illustrative embodiment, though other chain variations can also be included without restrictions on generality.

FIG. 6 shows a graph of an unstretched chain or a stretched open chain in straight condition. The length L as a function of the plate link position 1 through 14 is substantially equal and constant.

FIG. 7 is a graph of a chain that has been dynamically stretched in the wrap-around, closed condition. The length L variation is a function of the plate link position 1 through 14, whereby the edge plate links in positions 1 through 3 and 12 through 14 are more highly stretched than the plate links at the middle plate link positions 4 through 11. That result is based on the radial and circumferential bending of the rocker members and the corresponding high plastic deformation of the contact areas of plate links that are disposed at positions at the edge or near the edge.

FIG. 8 is a graph of a chain that has been dynamically stretched in the wrap-around, closed condition. The length difference ΔL variation is a function of the plate link positions 1 through 14, whereby the edge plate links in positions 1 through 3 and 12 through 14 are more highly stretched than the plate links at the middle plate link positions 4 through 11. That result is based on the radial and circumferential bending of the rocker members and the corresponding plastic deformation of the contact areas of plate links that are disposed at the edge or near the edge. The presentation in FIG. 8 clearly illustrates once again the inventive effect to increase the efficiency of the chain.

The small fluctuations in the length L, that is, in the elongation ΔL in the middle area results from measurement errors.

The elongation of the plate links during the stretching process produces a plastic deformation of the plate links in the contact areas between the plate links and the rocker members.

Through the particularly radially- and/or circumferentially-directed bending of the rocker members there results a plate link plastic deformation, which accommodates the angle between the movement direction and the rocker member.

Figure 9:
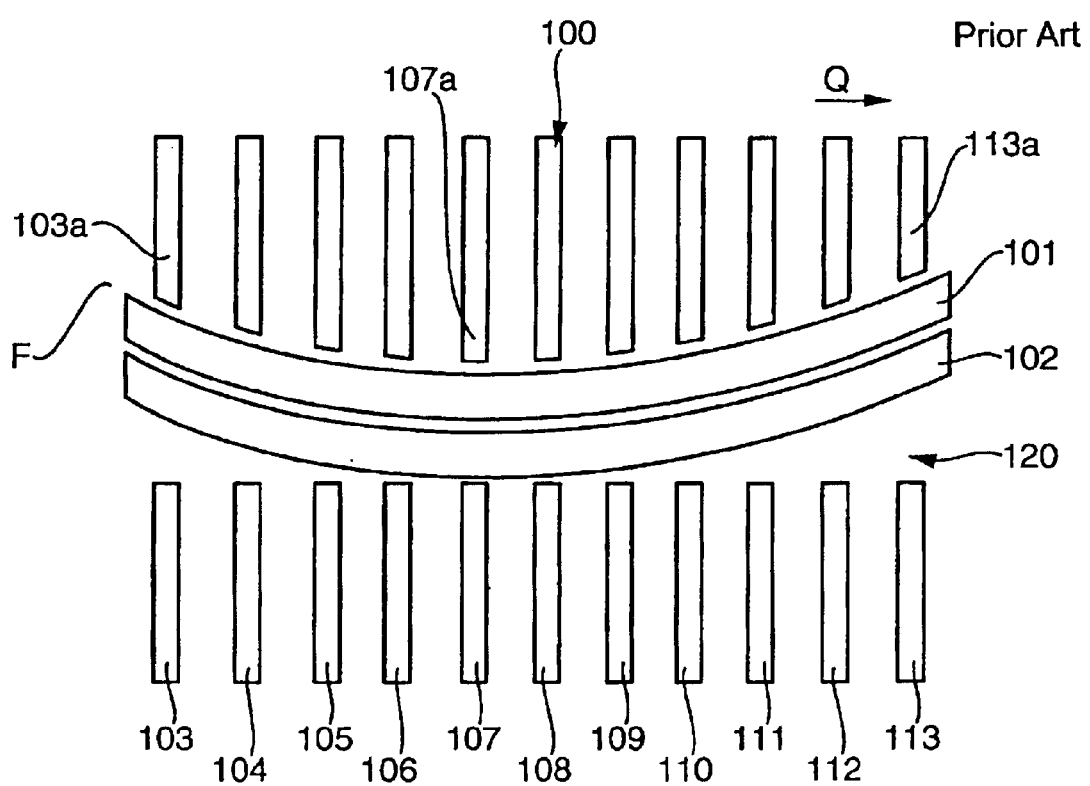
FIG. 9 shows a representation of elongation of plate links.

FIG. 9 shows a section of a chain 100 with rocker members 101 and 102, which are received in openings 120 of the plate links 103 through 113. The rocker members are represented as bent in the manner that they can be bent in a dynamic stretching process in the wrap-around mode, such as, for example, in the disk wedge. The representation is for illustration and is, of course, a somewhat exaggerated representation.

Figure 9A:
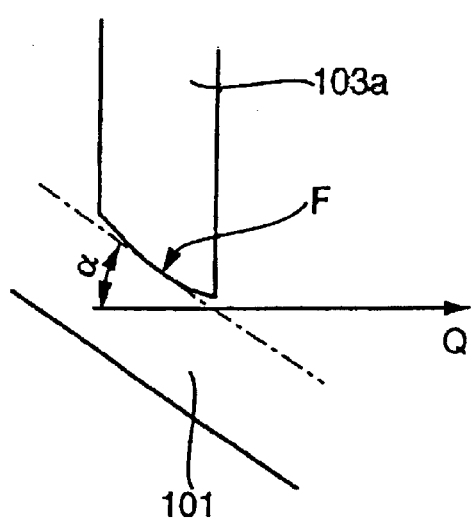
FIG. 9a shows an enlarged, fragmentary section of FIG. 9.
Figure 9B:
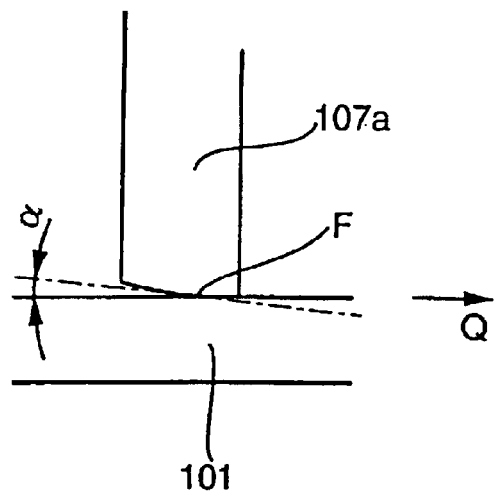
FIG. 9b shows another enlarged, fragmentary section of FIG. 9.

The contact areas 103a through 113a are plastically deformed by the bending of the rocker members 101 and 102 and match their contour with that of the rocker members. FIG. 9a and FIG. 9b each show a detail in which the outer plate links are more severely elongated and the plastic deformation leads to a larger angle a between the chain transverse direction Q and the contact surface F than at a middle plate link such as, for example, 107.

The angle α increases moving from the middle of the chain to the outside.

Figure 10:
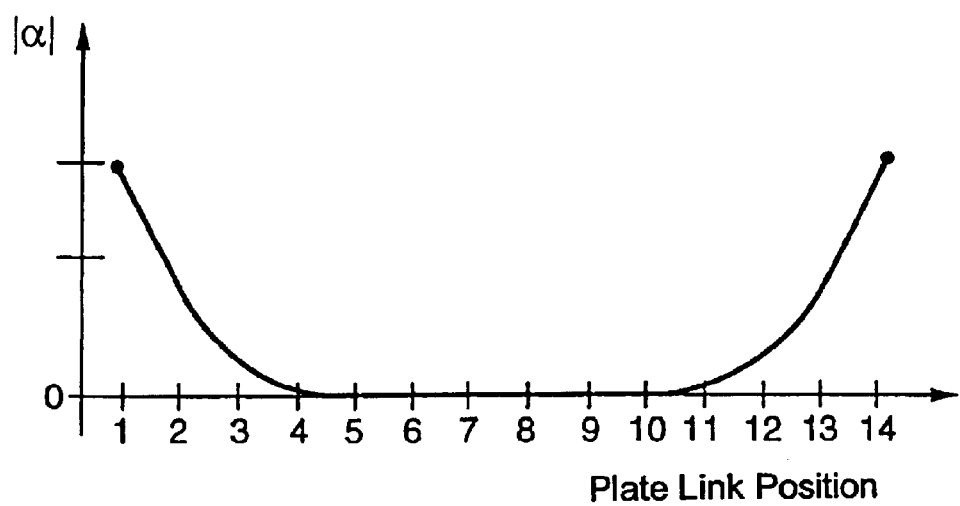
FIG. 10 shows a plot.

FIG. 10 shows a graph in which the angle ax is shown as the value |α| represented as a function of the plate link position. The angle increases outwardly toward the edges and returns to zero at the middle area. That can be achieved in accordance with the invention by stretching the loop member or, suitably by a further object of the invention, also by stretching the plate links in such a way before assembly, in which they are stretched to different angles ax and are subsequently mounted together to form a chain.

Figure 11:
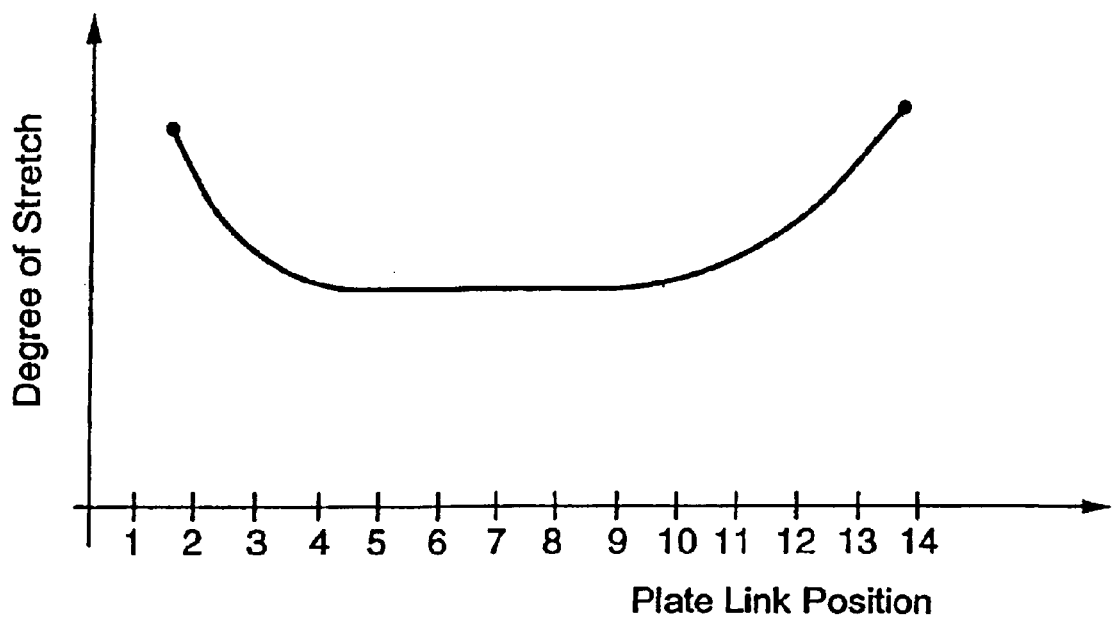
FIG. 11 shows a plot.
Figure 12:
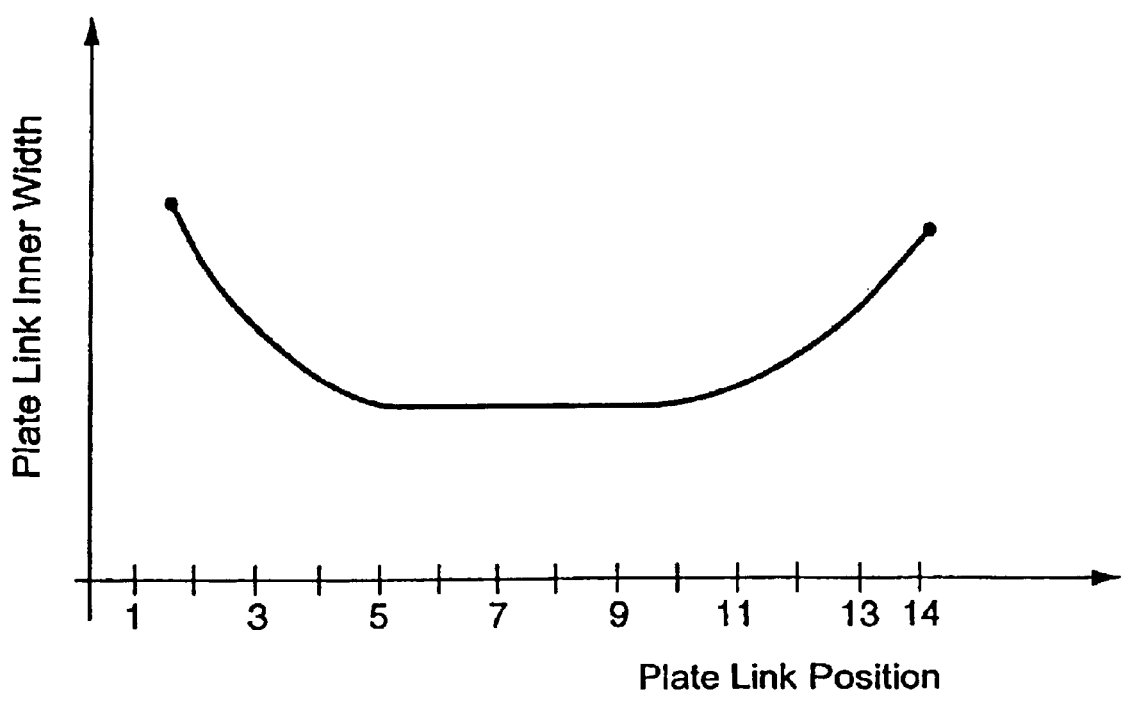
FIG. 12 shows a plot.

FIGS. 11 and 12 show the degree of stretch of the plate links, and the plate-link inner width, respectively, as a function of width-wise plate-link position.

The plate links near the edge are more highly loaded by the stretching in accordance with the invention than by a stretching process on a straight strand. Thereby the plate links at the edge are more highly elongated and the degree of stretch is higher.

Through the proper stretch loading of the chain by the stretching process the chain will be preconditioned in such way that during later operation of the chain in a transmission the loading will be equalized and the chain will therefore experience a longer service life.

Furthermore it is advantageous, for reducing the loading on the chain, that the force introduction by the rocker members to the link elements, by a two-area contact 80, 81 in conformance with FIG. 2, be equalized in both areas. Regarding that, reference is particularly made to German patent application DE 30 27 834, the contents of the disclosure of which expressly forms part of the content of the foregoing application.

Figure 13:
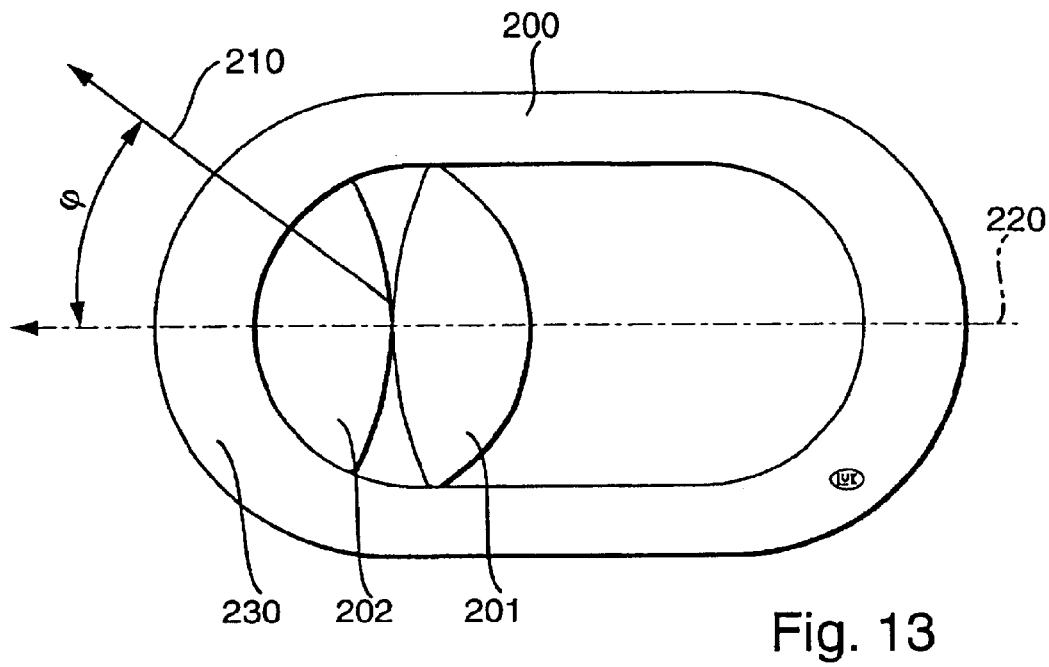
FIG. 13 shows a view of a plate link.

FIG. 13 shows a detail of a plate link 200 with rocker members 201 and 202, wherein the plate link is stretched in such a way by a stretching process that the force introduction of the stretching force 210 is oriented at an angle φ to the plate link, that is, to the chain length direction 220. During a stretching operation the angle φ will be varied so that it extends from about 60 degrees to about −60 degrees, so that the contact areas 230 will be stretched and plastically deformed over a wide angular range. Those plate links are also individually preconditioned.

Figure 14:
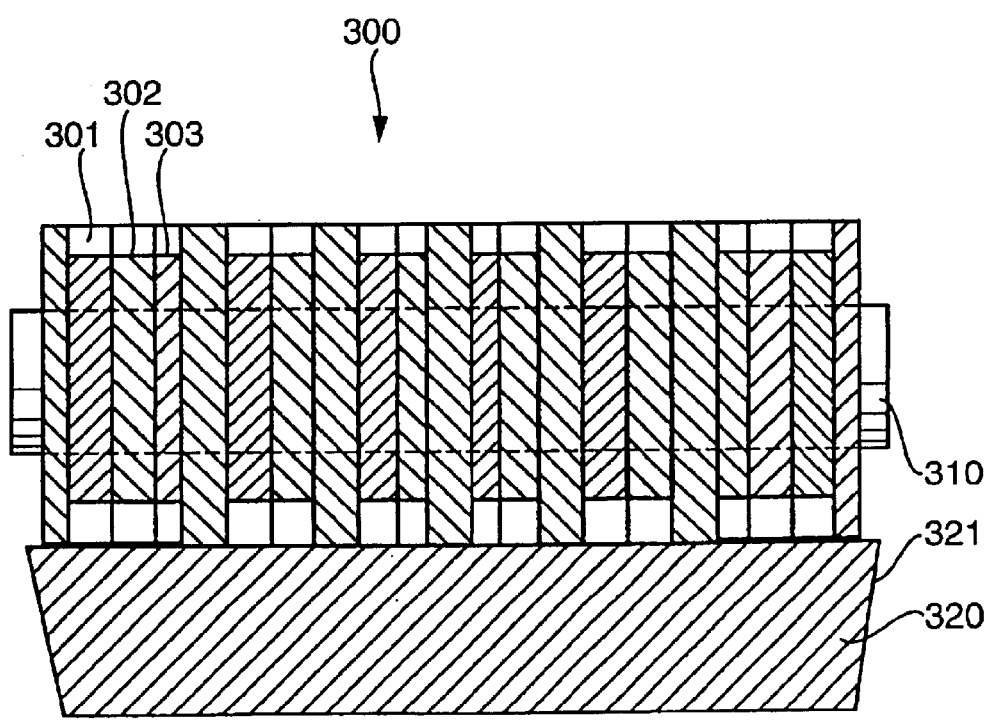
FIG. 14 shows a plate-link chain in section.

FIG. 14 shows a plate-link chain 300 in section, in which next to the plate links 301, 302, 303 and the rocker members 310 there exist cross pins 320 as a hinge for torque transmission between the conical disks and the chain. The frictional force transmission takes place at the end faces 321 of the cross-pins.

Figure 15:
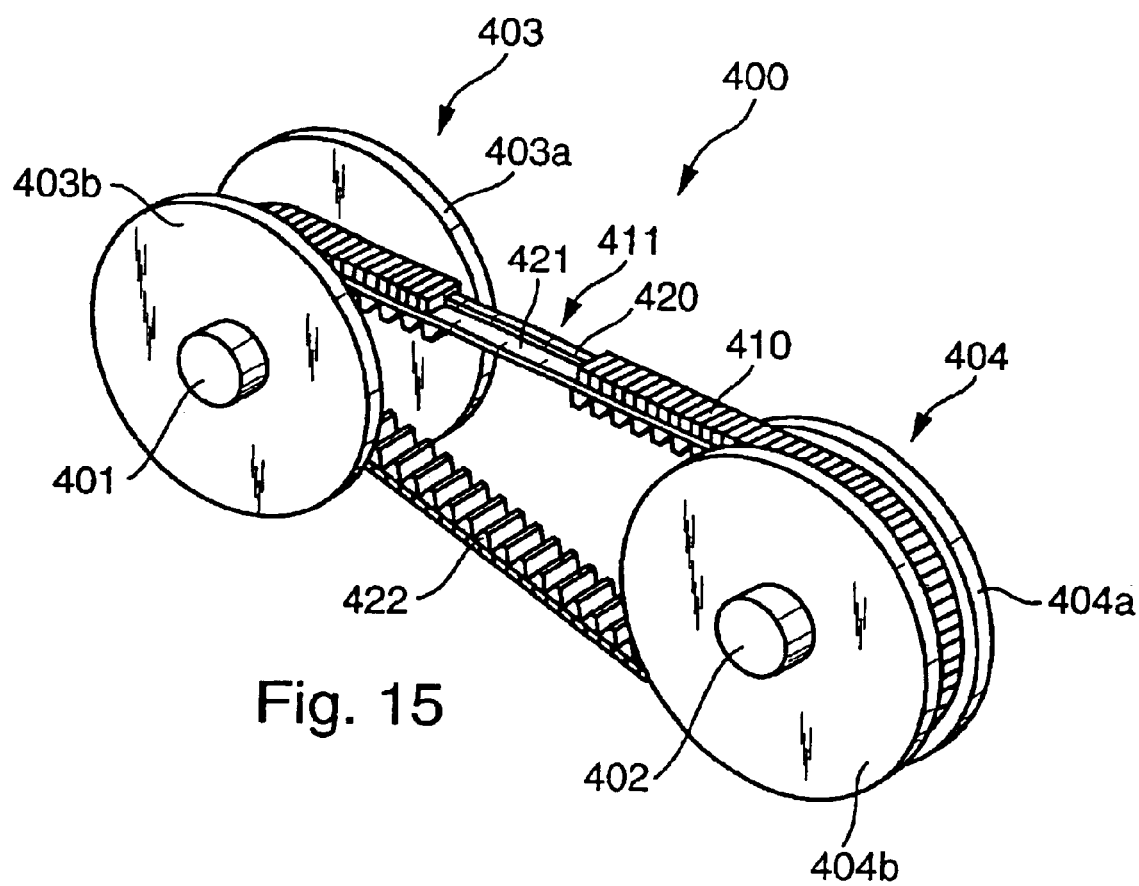
FIG. 15 shows a schematic representation of a transmission.

FIG. 15 schematically shows a transmission 400 in accordance with the invention with a first shaft 401, a second shaft 402 and conical disk pairs 403 and 404 arranged thereon. Conical disk pairs 403 and 404 have in each case two conical disks 403*a*, 403*b*, and 404*a*, 404*b*, of which in each case at least one of the two conical disks is movable axially relative to the shaft in question. An endless torque transmitting means 410, such as a plate-link chain or a thrust link belt, is arranged between the conical disk pairs for transmission of torque.

Figure 16:
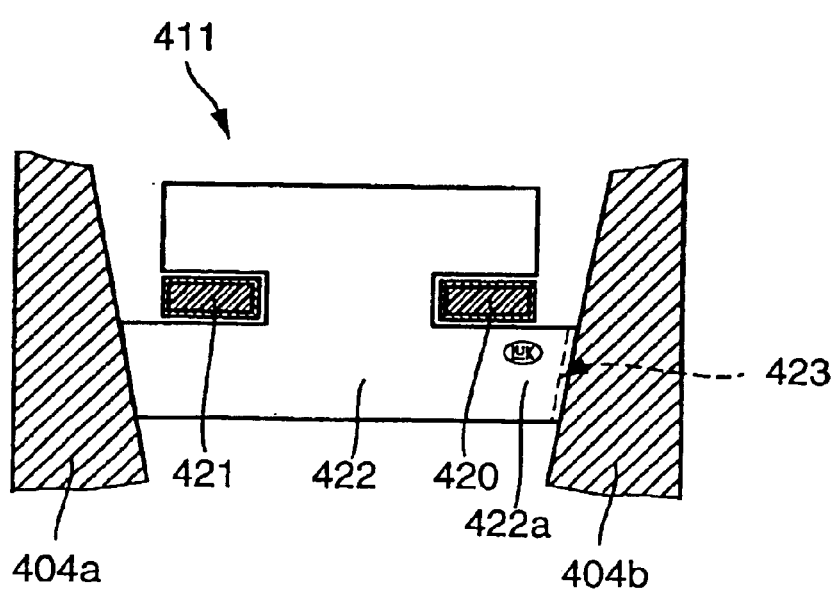
FIG. 16 shows a schematic representation of a thrust link band.

FIG. 16 schematically shows a thrust link belt 411 in accordance with the invention wherein at least one, advantageously two, closed band strands 420, 421 are provided, and they receive the thrust links 422, see also FIG. 15. FIG. 16 likewise shows the outer layer 423 of the end face 422*a* which is advantageously improved by a carbon-nitrided process, and if necessary a hardening process.

The claims included in the application are illustrative and are without prejudice to acquiring wider patent protection. The applicant reserves the right to claim additional combinations of features disclosed in the specification and/or drawings.

The references contained in the dependent claims point to further developments of the object of the main claim by means of the features of the particular claim; they are not to be construed as renunciation to independent, objective protection for the combinations of features of the related dependent claims.

Although the subject matter of the dependent claims can constitute separate and independent inventions in the light of the state of the art on the priority date, the applicants reserve the right to make them the subject of independent claims or separate statements. They can, moreover, also embody independent inventions that can be produced from the independent developments of the subject matter of the included dependent claims.

The exemplary embodiments are not to be considered to be limitations of the invention. On the contrary, many changes and variations are possible within the scope of the invention in the existing disclosure, in particular such variants, elements, and combinations and/or materials which, for example, are inventive by combining or modifying single features that are in combination and are described individually in relation to the general specification and embodiments as well as the claims and shown in the drawings, as well as elements or method steps that can be derived by a person skilled in the art in the light of the disclosed solutions of the problem, and which by means of combined features lead to a new object or new method steps or sequences of method steps, as well as manufacturing, testing and operational procedures.

What is claimed is:

1. A plate-link chain for engagement with conical disk surfaces of pulleys in continuously variable, conical disk transmissions, said chain comprising: a plurality of chain links extending along a chain movement direction and including side-by-side and end-to-end plate links having openings to receive articulation members formed as pairs of rocker members received in the openings of the plate links and having rocker surfaces supported against each other, wherein at least end faces of the rocker members that operatively contact surfaces of conical disks of a transmission have a nitrogen-enriched outer layer in the form of a carbon-nitrided layer, and wherein the conical disk surfaces engaged by the rocker member end faces have a nitrogen-enriched outer layer in the form of a carbon-nitrided layer.

2. A plate-link chain in accordance with claim 1, wherein the nitrogen content of each of the carbon-nitrided layers is between about 0.05% and about 0.1%.

3. A plate-link chain in accordance with claim 1, wherein after carbon-nitriding the rocker members are subjected to a case hardening process.

4. A plate-link chain in accordance with claim 3, wherein the case hardening depth is at least 0.3 mm.

5. A plate-link chain in accordance with claim 3, wherein the case hardening depth is at least 0.5 mm.

6. A plate link chain in accordance with claim 1, wherein the rocker members undergo an annealing treatment at a temperature of from about 780° C. to about 1050° C. in a carburizing atmosphere that includes a carbon-containing gas selected from the group consisting of natural gas, propane, ammonia, and mixtures thereof for a time sufficient to obtain a desired case hardening depth, and wherein the rocker members are subsequently cooled to a hardening temperature with subsequent martensitic hardening by quenching to a temperature below a martensitic formation temperature and tempered at a temperature of from about 150° C. to about 250° C.

7. A plate-link chain in accordance with claim 1, wherein the carbon-nitrided layers have a nitrogen content of at least about 0.01% and have a thickness of at least about 50 μm.

8. A thrust link belt for engagement with conical disk surfaces of pulleys in continuously variable, conical disk transmissions, said thrust link belt comprising: at least one closed belt strand in the form of an endless loop, and a plurality of laterally-extending, face-to-back thrust links in the form of plates carried by the strand, wherein at least lateral end faces of the thrust links that operatively contact surfaces of conical disks of a transmission have a nitrogen-enriched outer layer in the form of a carbon-nitrided layer, and wherein the conical disk surfaces engaged by the end faces of the thrust links have a nitrogen-enriched outer layer in the form of a carbon-nitrided layer.

9. A thrust link belt in accordance with claim 8, wherein the nitrogen content of each of the carbon-nitrided layers is between about 0.05% and about 0.

10. A thrust link belt in accordance with claim 8, wherein after carbon-nitriding the end faces of the thrust links are subjected to a case hardening process.

11. A thrust link belt in accordance with claim 10, wherein the case hardening depth is at least 0.3 mm.

12. A thrust link belt in accordance with claim 10, wherein the case hardening depth is at least 0.5 mm.

13. A thrust link belt in accordance with claim 8, wherein the thrust links undergo an annealing treatment at a temperature of from about 780° C. to about 1050° C. in a carburizing atmosphere that includes a carbon-containing gas selected from the group consisting of natural gas, propane, ammonia, and mixtures thereof for a time sufficient to obtain a desired case hardening depth, and wherein the end faces of the trust links are subsequently cooled to a hardening temperature with subsequent martensitic hardening by quenching to a temperature below a martensitic formation temperature and tempered at a temperature of from about 150° C. to about 250° C.

14. A thrust link belt in accordance with claim 8, wherein the carbon-nitrided layers have a nitrogen content of at least about 0.01% and have a thickness of at least about 50 μm.

15. A continuously variable, conical disk transmission, said transmission comprising: a first shaft and a second shaft, whereby on each of the first and the second shafts two conical disks are provided with substantially frustum-like surfaces facing toward one another, and wherein at least one conical disk per shaft is axially movable relative to the shaft, wherein at least the frustum-like surfaces of the conical disks that operatively frictionally contact an endless torque-transmitting means include a nitrogen-enriched outer surface layer in the form of a carbon-nitrided layer, and wherein end surfaces of the endless torque-transmitting means that engage the conical disk surfaces have a nitrogen-enriched outer layer in the form of a carbon-nitrided layer.

16. A continuously variable, conical disk transmission in accordance with claim 3, wherein the nitrogen content of each of the carbon-nitrided layers is between about 0.05% and about 0.1%.

17. A continuously variable, conical disk transmission in accordance with claim 15, wherein after carbon-nitriding the end surfaces of the endless torque-transmitting means are subjected to a case hardening process.

18. A continuously variable, conical disk transmission in accordance with claim 17, wherein the case hardening depth is at least 0.3 mm.

19. A continuously variable, conical disk transmission in accordance with claim 17, wherein the case hardening depth is at least 0.5 mm.

20. A continuously variable, conical disk transmission in accordance with claim 15, wherein the conical disks undergo an annealing treatment at a temperature of from about 780° C. to about 1050° C. in a carburizing atmosphere that includes a carbon-containing gas selected from the group consisting of natural gas, propane, ammonia, and mixtures thereof for a time sufficient to obtain a desired case hardening depth, and wherein end surfaces of the endless torque-transmitting means that contact the conical disks are subsequently cooled to a hardening temperature with subsequent martensitic hardening by quenching to a temperature below a martensitic formation temperature and tempered at a temperature of from about 150° C. to about 250° C.

21. A continuously variable, conical disk transmission in accordance with claim 15, wherein the carbon-nitrided layers have a nitrogen content of at least about 0.01% and have a thickness of at least about 50 $\mu$m.

* * * * *